July 8, 1969 YASUO SUZUKI ET AL 3,454,801

SELF-STARTING SYNCHRONOUS MOTOR

Filed Jan. 24, 1966 Sheet 1 of 4

INVENTORS
YASUO SUZUKI
YASUYOSHI KAMEYAMA

United States Patent Office 3,454,801
Patented July 8, 1969

3,454,801
SELF-STARTING SYNCHRONOUS MOTOR
Yasuo Suzuki and Yasuyoshi Kameyama, Kadoma-shi, Japan, assignors to Matsushita Denko Kabushiki Kaisha, Osaka, Japan, a corporation of Japan
Filed Jan. 24, 1966, Ser. No. 522,663
Claims priority, application Japan, Feb. 1, 1965, 40/5,425
Int. Cl. H02k 21/12
U.S. Cl. 310—156      2 Claims

ABSTRACT OF THE DISCLOSURE

A synchronous motor wherein the rotor is formed by combining a permanent magnet with hysteresis disks so that desired average characteristics of inductor type synchronous motors and of hysteresis type synchronous motors may be obtained.

---

This invention relates to small type self-starting synchronous motors.

There have been suggested such synchronous motors as inductor type synchronous motors and hysteresis type synchronous motors. However, the inductor type synchronous motor has a feature that its torque during the rotation is large but has defects that it presents so-called cogging (or torque fluctuation) and particularly that its starting torque is small and indefinite and that the direction of rotation is indefinite. On the other hand, the hysteresis type synchronous motor has a constant starting torque and a definite direction startability but its torque during the rotation is very small.

The present invention has been suggested to eliminate the above mentioned defects.

An object of the present invention is to provide a synchronous motor wherein a rotor is formed by combining a permanent magnet with hysteresis disks so that there may be average characteristics of both inductor type synchronous motor and hysteresis type synchronous motor, the torque in starting may be constant in a fixed direction, there may be no cogging (torque fluctuation) in the rotation and the rotating torque may be smaller than of an inductor type synchronous motor but far larger than of a hysteresis type synchronous motor.

Another object of the present invention is to provide a synchronous motor wherein the ratio of the diameter of a permanent magnet to the diameter of a hysteresis disk in a rotor is so selected in design that the characteristics may be close to those of an inductor type synchronous motor or of a hysteresis type synchronous motor and that the motor may be adapted to wide uses.

A further object of the present invention is to provide a synchronous motor wherein there is a startability in a definite direction so that no device for preventing reversal may be required in the loading mechanism and the rotating torque is rather so large that the loading mechanism can be greatly simplified.

According to the present invention, there is provided a self-starting synchronous motor comprising a field magnet plate having a plurality of convex poles, means for producing a rotary magnetic field between said convex poles and a rotor rotating between said convex poles, said rotor being made by fitting an inductor magnetized at its periphery with N and S poles alternately and a hysteresis disk in close contact with each other and the diameter of said hysteresis disk being made smaller than that of said inductor.

Said objects, other objects and characteristic features of the present invention will become evident and will be readily understood by the following description and claims taken in conjunction with the accompanying drawings, in which:

Figure 4A:
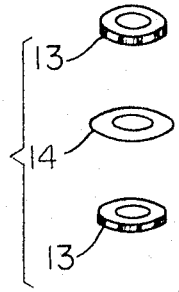
Figure 4B:
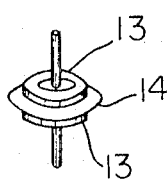
Figure 1:
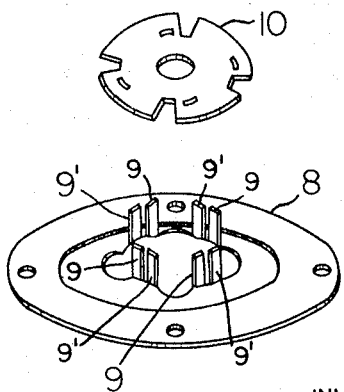
Figure 5:
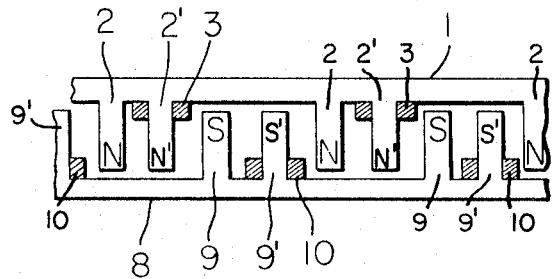
FIG. 5 is a developed view showing the arrangement of field magnet poles.

In FIGS. 1 to 5, 1 is one of two field magnet plates forming a stator in combination with each other and said field magnet plate 1 is formed of a magnetic material in the form of a cup and having a plurality of convex poles 2 bent and formed inward. A shading disk 3 is alternately fitted to the convex poles 2 and 2'. Said shading disk 3 is a circular copper plate having cuts 4 and holes 5 made in response alternately to the above mentioned convex poles 2 and 2' so that the convex poles passing through the respective holes 5 may be lagging field magnet poles fitted with the shading disk. Said shading disk 3 serves also as a bracket for a rotor bearing 6. 7 is a field magnet coil housed in the field magnet plate 1. 8 is another field magnet plate for forming the stator in combination with said field magnet plate 1, which field magnet plate 8 is made in the form of a disk and having a plurality of convex poles 9 and 9' bent and formed inward. 10 is a shading disk of the same shape as of the above mentioned shading disk 3 and is fitted alternately to the convex poles 9 and 9'. Being in such formation, the convex poles 2 and 2' projecting out of the field magnet plate 1 and the convex poles 9 and 9' projecting out of the field magnet plate 8 will be excited respectively always in polarities reverse to each other and will form such magnetic pole arrangement as is shown in FIG. 5.

Figure 2:
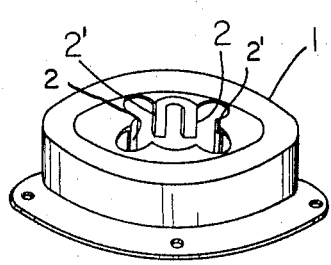
FIG. 2 is a vertically sectioned side view of the same motor.
Figure 1:
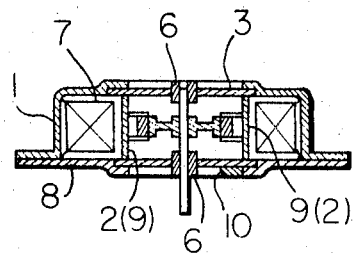
FIG. 1 is a perspective view of a synchronous motor embodying the present invention as disassembled.

The stator comprising the field magnetic plates 1 and 8 as shown in FIG. 1 is of the case where the number of motor poles is eight, wherein eight convex poles are bent and formed as respective pairs of two on each of two field magnet plates 1 and 8 to be excited in polarities reverse to each other by a field magnet coil 7, one convex pole 2 of each pair being inserted into a cut 4 in a shading disk 3 so as to be an unshaded pole, the other convex pole 2' of the pair being passed through a hole 5 in the shading disk 3 so as to be a shaded pole delayed in the phase with respect to the convex pole 2 under the shading effect and, therefore, four unshaded poles 2 and four shaded poles 2' are respectively alternately formed on the field magnet plate 1.

In the same manner, four unshaded poles 9 and four shaded poles 9' are respectively alternately formed on the other field magnet plate 8. All of the eight unshaded poles 2 and 9 and eight shaded poles 2' and 9' formed on these two field magnet plates 1 and 8 are so set that the pairs of the convex poles on the respective field magnet plates may be alternately combined as shown in FIG. 5.

Figure 3A:
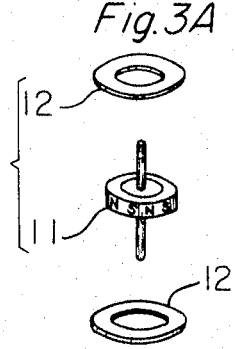
FIGS. 3A, 3B, 4A and 4B are perspective views of respective rotors as disassembled and assembled.
Figure 3B:
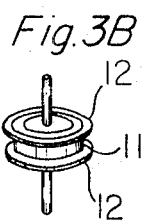
Figure 1:
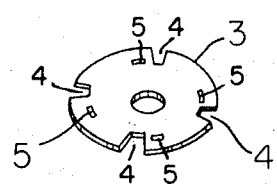
Figure 1:
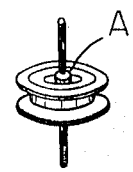
Figure 1:

Turning again to FIG. 1, A is a rotor consisting of at least a permanent magnet and likely a hysteresis disk, exemplary structures of which rotor are illustrated in FIGS. 3A to 4B. The permanent magnet, known as an inductor, of the rotor to be used in this case is magnetized so as to be provided around its periphery with a total of eight poles, alternately N and S poles at a regular interval. An exemplary rotor shown in FIGS. 3A and 3B is made by fitting hysteresis disks 12 respectively to each end surface of a circular permanent magnet 11 having N and S poles alternately around its periphery. It should be here appreciated that the number of respective magnetic poles of the rotor is identical to that of the corresponding convex pole pairs of respective field magnet plates for the stator.

The other exemplary rotor shown in FIGS. 4A and 4B is made by inserting a hysteresis disk 14 between two circular permanent magnets 13, respectively having N and S poles at the periphery in such manner that the magnetic poles of the same polarity of the two permanent magnets 13 may be arranged on the same generatrix. The hysteresis disk can be formed to be a hysteresis ring of such material of a low magnetic permeability as, for example, a quenched carbon steel.

The features of the motor having such structure are described above according to the present invention are as follows:

(a) The rotor is easy to make and is low in cost.

The hysteretic material used for the rotor is, as shown in FIGS. 3A to 4B, a disk made by punching a tungsten carbon steel sheet and then quenching it so that the coercive force Hc may be 50 to 60 oersteds and the residual induction Br may be 8 to $10 \times 10^3$ gausses. The inductor is a barium ferrite magnet of a coercive force Hc of 1.8 to $1.9 \times 10^3$ oersteds and a residual induction Br of 2.0 to $2.3 \times 10^3$ gausses and is of a cost about $\frac{1}{5}$ to $\frac{1}{10}$ the cost of any other cast magnet. Further, the diameter of this inductor is about 2 to 4 mm. smaller than the diameter of the hysteresis disk and, therefore, the production tolerance of the inductor made by being fired can be well absorbed. Therefore, the inductor is fired and then ground so that the production tolerance may be small when it is used. The cost of the inductor according to the present invention is much lower than the production cost of the inductor of any other general rotor.

(b) The magnetic poles of such permanent magnet low in permeability and high in coercive force, such as barium ferrite, cannot be easily moved within the inductor ring. Therefore, unless a special mechanism is used, it will be very difficult to self-start in a specific direction a rotor made of only a permanent magnet. But, on the other hand, the time until a synchronous speed is reached is very short and the torque is large. Further, in case a rotor is formed of only a hysteresis disk, the hysteresis disk will be excited by the field magnets generated by the magnetic poles of the stator so that magnetic poles may be made. Further, these magnetic poles can move comparatively easily within the hysteresis disk and, therefore, the rotor can be self-started always in a specific direction with the rotary field magnets generated by the stator poles but, due to the movement (slip) of the magnetic poles within the disk, there will be a considerable time until a synchronous speed is reached and the torque will be small. Therefore, in the present invention, the permanent magnet and the hysteresis disk are kept in close contact with each other so that weak magnetic poles may be held in advance by the magnetic poles of the permanent magnet within the hysteresis disk and further, in order that these magnetic poles may move to some extend within the hysteresis disk, the outside diameter of the hysteresis disk is made about 2 to 4 mm. larger than that of the inductor so that all or the greater part of the magnetic force of the inductor may act on the rotary field magnets generated by the magnetic poles of the stator through the hysteresis disk. Therefore, in the present invention, it is possible to eliminate the defect in the case that the rotor is formed of only an inductor and to increase the rotary torque.

The starting phenomenon of the rotor by the present invention shall be explained in the following.

FIG. 5 is, as referred to before, a developed view showing a field magnet pole arrangement in the stator. In FIG. 5, 2 is an unshaded pole of the field magnetic plate 1, 2' is a shaded pole of the same and fitted with a shading plate 3, and these poles 2 and 2' are formed by punching and raising a single magnetic iron plate when the plate 1 is made. 9 is an unshaded pole of the other field magnetic plate 8, 9' is a shaded pole of the same and fitted with a shading plate 10 in the same manner as in the pole 2' and these poles 9' are formed of a single magnetic iron plate simultaneously with the unshaded poles 9.

Therefore, when these field magnet poles 2, 2', 9, 9' are excited by the exciting coil 7 and the poles 2 and 2' are excited in the same polxarity, for example, in the N pole, the poles 9 and 9' will be excited in the S pole reverse to the polarity of the poles 2 and 2'.

Figure 10:
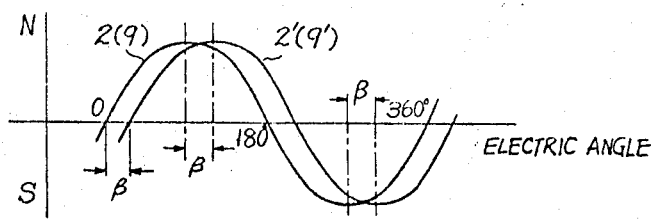
FIG. 10 shows diagrammatically excitation relation between the unshaded pole and shaded pole of the stator in the motor according to the present invention.

As shown in FIG. 10, the shaded pole 2' will be excited as delayed by $\beta°$ in the electric angle from the unshaded pole 2 by the shading action of the shading plate 3. In the same manner, the shaded pole 9' will be excited as delayed by $\beta°$ in the electric angle from the unshaded pole 9 by the shading action of the shading plate 10.

Figure 11:
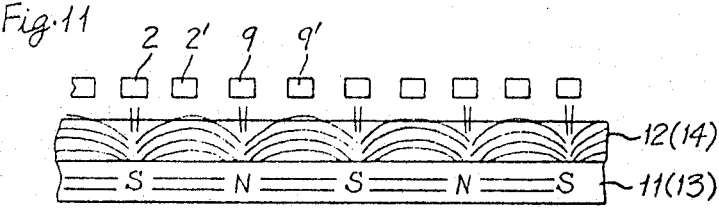
FIG. 11 is an explanatory developed view showing the magnetic coupling relation between the stator poles and the rotor poles in a switch-off state.

FIG. 11 is an explanatory view showing the relation between the stator pole arrangement and the rotor poles in a so-called switch-off state in which no current is passed through the exciting coil 7. The rotor in this case consists of a hysteresis element and an inductor element. As mentioned in the foregoing, the outside diameter of the inductor is smaller than the outside diameter of the hysteresis disk, thus, the distance from the stator pole is large and, as the inductance element and hysteresis element are in close contact with each other, most of the magnetic poles of the inductor are short-circuited in the hysteresis disk and the rate of connecting the lines of magnetic force with the stator pole is very small. This means that the hysteresis disk will be multipolarly excited in advance by the magnet. Further, it should be noted that the number of magnetic poles magnetized on the inductor element is half the number of the stator poles. In other words, the number of the magnetic poles of the inductor element is equal to the number of the unshaded poles of the stator. Or reversely, as the number of the unshaded poles is equal to the number of the shaded poles, the number of the magnetic poles is equal also to that of the shaded poles.

Figure 12:
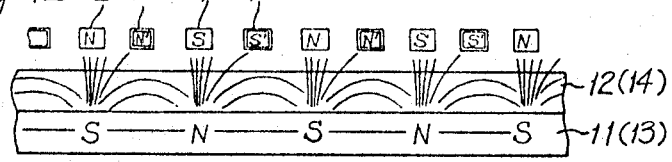
FIG. 12 shows the magnetic coupling relation of FIG. 11, but in a switch-in state.

Now, in case the exciting coil 7 is connected to an alternating current source and is switched in, the stator poles 2, 2', 9, 9', 2, 2', 9, 9, . . . will be simultaneously excited in the order of N, N', S, S', N, N', S, S', . . . from left to right as shown in FIG. 5 or FIG. 12. Here N and S represent unshaded poles 2 and 9 and N' and S' represent shaded poles 2' and 9'.

Figure 13:
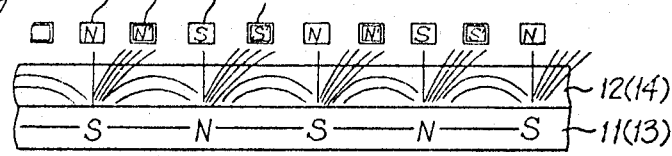
FIG. 13 shows a further magnetic coupling relation where the self-starting torque is generated.

Before the stator poles are excited, most of the magnetic fluxes generated from the magnetic poles of the inductor have been short-circuited in the hysteresis disk. But, when the stator poles are excited, the magnetic fluxes of the inductor will be connected with the magnetic fluxes of the stator poles through the hysteresis disk. As the magnetic flux of the shaded poles 2', 9' varies as delayed by $\beta°$ in the time from the magnetic flux of the unshaded poles 2, 9 as shown in FIG. 10, after the magnetic flux of the unshaded poles attenuate past the maximum value, the magnetic flux of the shaded pole will reach the maximum value. Therefore, the magnetic fluxes of the rotor connected mostly with the unshaded poles will then be connected mostly with the shaded poles. As a result, a torque in the rightward direction in FIG. 13 will be generated in the rotor and the rotor will move, i.e., will rotate, to the position where the rotor will oppose the shaded pole. Then, after the half cycle of the source frequency, the polarity of the unshaded pole will reverse so that the unshaded pole showing the N pole may change to show the S pole and the unshaded pole showing the S pole may change to show the N pole. Therefore, the rotor will continuously move by keeping a rightward movement, that is, a rightward rotation.

In case such polarity as in FIG. 12 is not made at the moment of switching in the exciting coil, the magnetic flux generated by the inductor will never be connected with the magnetic flux generated by the stator pole and the magnetic flux generated by the inductor during a half cycle of the source frequency will remain short-circuited all by 100% in the hysteresis disk and will be connected with the stator pole as shown in FIG. 12 only when the polarity of the stator pole changes after a half cycle. Therefore, in whatever phase the electric source is switched in, the rotor will be able to self-start always in one direction.

As explained in the above, in the rotor according to the present invention, the magnetic flux of the inductor will be connected with the magnetic flux of the stator pole not directly but through the hysteresis element and, therefore, the magnetic flux of the once magnetized inductor can not move in the inductor element but can freely rock and move to some extent in the hysteresis element. This is the greatest feature of the hysteresis rotor.

If the outside diameter of the inductor is made larger than the outside diameter of the hysteresis disk as disclosed in, for example, U.S. Patent 3,181,019, the magnetic flux of the inductor will be no longer connected with the magnetic flux of the stator pole through the hysteresis disk but will be connected directly with the magnetic flux of the stator pole. Therefore, unless the stator pole arrangement is not made as described later, it will be impossible to self-start this inductor element in one direction and the starting torque in one direction will be fed only by the hysteresis disk. In such case, the torque generated by the hysteresis disk will be so smaller than the torque generated by the inductor element that, in case the source phase for the switch-in is a trouble to the self-start in one direction of the rotor, when the starting torque of the rotation in the reverse direction generated by the inductor element is larger than the starting torque in the normal direction generated by the hysteresis disk, he hysteresis disk will start in the reverse rotation.

There have been further suggested various types of the motor referred to, for example, in U.S. Patents 2,437,142, 2,951,957, 2,981,855 and 3,014,141. However, the stator pole arrangement disclosed in the U. S. Patent 3,014,141 is the type that, as explained in 2,981,855 of the same inventor and likewise in the other patents, the unshaded poles and shaded poles are arranged respectively as groups and, thus, the same is applicable only to the case where the rotor is an inductor. The basic principle of the particular motor is explained in detail in the U.S. Patent 2,437,142. That is to say, it is a requirement that the unshaded poles and shaded poles should be so arranged that when the deflection angle between the unshaded pole and shaded pole is $\alpha°$ in the electric angle and the lag angle of the magnetic flux of the shaded pole with the unshaded pole is $\beta°$ in the electric angle, the relation of $\alpha+\beta+180°$ may be established. If a rotor formed only of a hysteresis disk is applied to this kind of stator represented by the cited reference, not only the rotor will not be able to be self-started but also, even if the rotor is accelerated to a synchronized revolution number by an external force, when the external force is removed, the rotor will stop. This has been confirmed by experiments performed by the present inventors.

Figure 14:
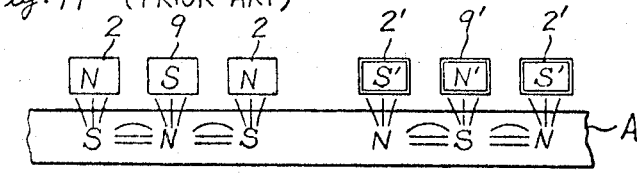
FIG. 14 is an explanatory developed view showing the relation between stator poles and rotor poles of a conventional motor.

This is because, as shown in FIG. 14, the hysteresis disk will be induced and excited only by the field magnets generated by the stator poles to generate magnetic poles but the magnetic poles of the rotor generated in the positions opposite the respective poles generate only equal attracting or repulsing forces in the right and left directions and the hysteresis disk will not be started in either of the directions. Thus, even if the phase of the electric source changes, this relation will be always established and therefore the hysteresis disk can never be started. In short, in order to self-start the hysteresis disk in the same direction, it is a requirement that, in the stator poles, as shown in FIG. 5, the unshaded poles and shaded poles of the same polarity should be adjacently arranged, then the unshaded poles and shaded poles of the polarity reverse to that of the above-mentioned two kinds of poles should be adjacently arranged and the respective poles should be arranged by continuing this arranging order.

The characteristics of the synchronous motor of the present invention shall now be described.

Figure 6A:
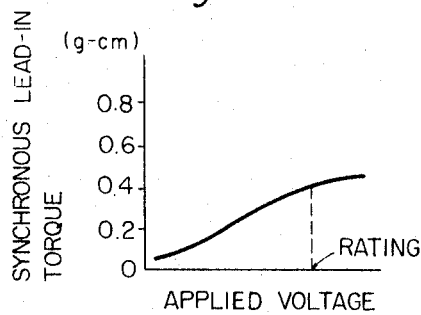
FIGS. 6A and 6B show characteristics of a hysteresis motor.
Figure 6B:
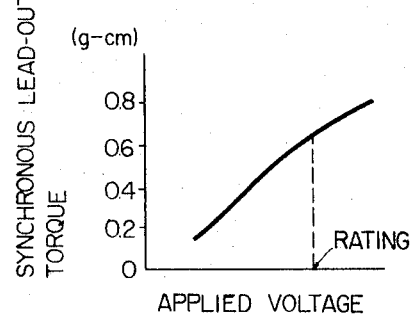

FIGS. 6A and 6B show characteristics of a hysteresis motor FIG. 6A shows a synchronous lead-in torque as plotted on the ordinate and an applied voltage as plotted on the abscissa. FIG. 6B shows a synchronous lead-out torque as plotted on the ordinate and an applied voltage as plotted on the abscissa.

Figure 7:
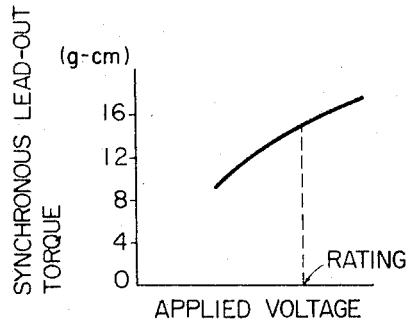
FIG. 7 shows characteristics of an inductor motor.

FIG. 7 shows characteristics of an inductor motor. A synchronous lead-out torque is represented as plotted on the ordinate and an applied voltage is represented as plotted on the abscissa. In the case of the inductor motor, the starting direction of the synchronous lead-in torque is not fixed and the torque can not be plotted.

Figure 8A:
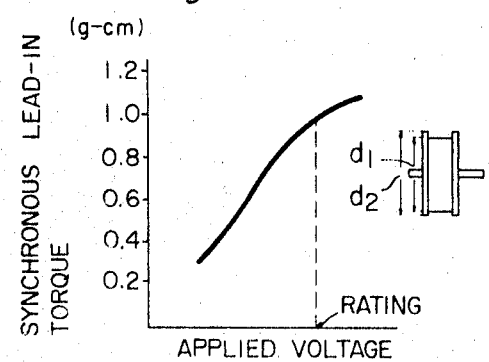
FIGS. 8A and 8B show characteristics of the present invention in case that the diameter of the inductor is made comparatively larger than the diameter of the hysteresis disk.
Figure 8B:
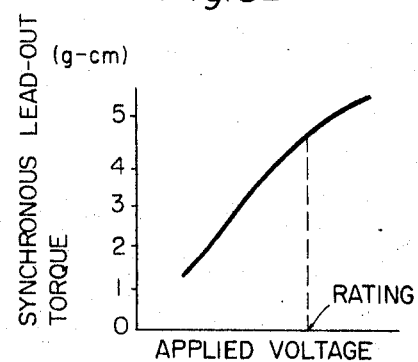

FIGS 8A and 8B are of the case that, in the motor of the present invention, the diameter $d_1$ of the inductor is made comparatively larger than the diameter $d_2$ of the hysteresis disk. FIG. 8A shows the relation between the synchronous lead-in torque and the applied voltage. FIG. 8B shows the relation between the synchronous lead-out torque and the applied voltage.

Figure 9A:
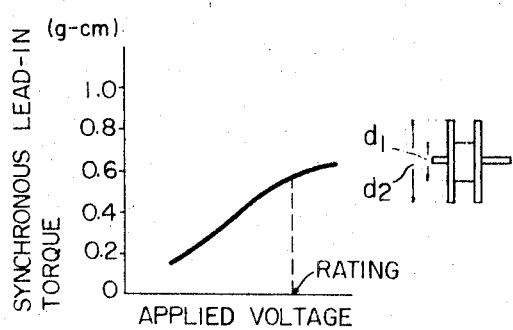
FIGS. 9A and 9B show characteristics of the present invention in case that the diameter of the inductor is made smaller than the diameter of the hysteresis disk.
Figure 9B:
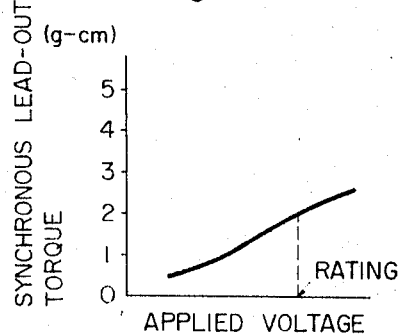

FIGS. 9A and 9B are of the case that the diameter $d_1$ of the inductor is made smaller than the diameter $d_2$ of the hysteresis disk. FIG. 9A shows the relation between the synchronous lead-in torque and the applied voltage. FIG. 9B shows the relation between the synchronous lead-out torque and the applied voltage.

From the above description, when the diameter $d_1$ of the inductor is large, the effect of the inductor will be so strong tha the motor will self-start but will have no directivity.

Further, when the diameter of the inductor is made smaller, the characteristics of a hysteresis motor will be approached and the self-startability will be high but the torque will be smaller.

Thus the present invention is characterized by bringing a hysteresis ring or disk into close contact with an inductor so that they may influence each other to reduce the effect of the inductor and making the diameter of the inductor smaller than the diameter of the hysteresis disk or ring so as to reduce the effect of the inductor. Thereby the synchronous motor can be self-started always in the same direction and can be rotated smoothly by reducing cogging.

Further, the present invention has an effect that a motor of characteristics close to those of an inductor type synchronous motor or of a hysteresis type synchronous motor can be freely designed as desired.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A self-starting synchronous motor comprising a stator consisting of upper and lower field magnetic plates, a coil for exciting said upper and lower field magnetic plates of the stator, and a rotor rotatably arranged concentrically with its axis between said upper and lower field magnetic plates, said upper field magnetic plates of the stator being provided with a plurality of downward convex pole pairs respectively consisting of an unshaded pole and a shaded pole and being aligned on an inner peripheral line of the plate around said rotor, said lower field magentic plate being provided with a plurality of upward convex pole pairs of the unshaded and shaded poles corresponding in number to said downward convex pole pairs and aligned on the inner peripheral line around said rotor, said upper and lower field magnetic plates being assembled in a pile so that respective pairs of the downward and upward convex poles will alternately be in the adjacent relation and aligned in a single circle line, said coil being arranged between said upper and lower field magnetic plates of the stator so as to surround the circular aligned downward and upward convex pole pairs for exciting the pairs respectively in an opposite polarity relation, said rotor being formed with a circular permanent magnet magnetized to have the same number of magnetic N and S poles alternately at its periphery as the sum of said downward and upward convex pole pairs of the stator and two hysteresis disks respectively having a larger diameter than that of said permanent magnet and fitted closely on each end surface of said permanent magnet, so that the permanent magnet will always excite the hysteresis disks and most of magnetic flux of the magnet will be coupled through the hysteresis disks with magnetic flux of said stator.

2. A self-starting synchronous motor comprising a stator consisting of upper and lower field magnetic plates, a coil for exciting said upper and lower field magnetic plates of the stator, and a rotor rotatably arranged concentrically with its axis between said upper and lower field magnetic plates, said upper field magnetic plates of the stator being provided with a plurality of downward convex pole pairs respectively consisting of an unshaded pole and a shaded pole and being aligned on an inner peripheral line of the plate around said rotor, said lower field magnetic plate being provided with a plurality of upward convex pole pairs of the unshaded and shaded poles corresponding in number to said downward convex pole pairs and aligned on the inner peripheral line around said rotor, said upper and lower field magnetic plates being assembled in a pile so that respective pairs of the downward and upward convex poles will alternately be in the adjacent relation and aligned in a single circle line, said coil being arranged between said upper and lower field magnetic plates of the stator so as to surround the circular aligned downward and upward convex pole pairs for exciting the pairs respectively in an opposite polarity relation, said rotor being formed with two circular permanent magnets of the same diameter respectively magnetized to have the same number of magnetic N and S poles alternately at their peripheries as the sum of said downward and upward convex pole pairs of the stator and a hysteresis disk having a larger diameter than that of said permanent magnets and held by said permanent magnets in a close contact with each other, so that the permanent magnet will always excite the hysteresis disks and most of magnetic flux of the magnet will be coupled through the hysteresis disks with magnetic flux of said stator.

References Cited

UNITED STATES PATENTS

| 3,014,141 | 12/1961 | Riggs | 310—156 |
| 3,181,019 | 4/1965 | Pfister et al. | 310—156 |

MILTON O. HIRSHFIELD, *Primary Examiner.*

L. L. SMITH, *Assistant Examiner.*

U.S. Cl. X.R.

310—41